(12) United States Patent
Harkcom et al.

(10) Patent No.: US 9,622,404 B2
(45) Date of Patent: Apr. 18, 2017

(54) INTEGRAL LATERAL TRANSPORT OF A MOWER

(71) Applicant: CNH AMERICA, LLC, New Holland, PA (US)

(72) Inventors: Melanie W. Harkcom, New Holland, PA (US); Cecil R. Sudbrack, New Holland, PA (US); Derek S. Rude, Muenster (CA); Murray Kosokowsky, Pilger (CA); John H. Posselius, Ephrata, PA (US); Roger Huggard, Ephrata, PA (US); Michael J. Digman, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 304 days.

(21) Appl. No.: 14/024,256

(22) Filed: Sep. 11, 2013

(65) Prior Publication Data

US 2015/0068177 A1 Mar. 12, 2015

(51) Int. Cl.
*A01B 73/00* (2006.01)
*A01D 34/00* (2006.01)
(Continued)

(52) U.S. Cl.
CPC ........... *A01D 34/001* (2013.01); *A01D 34/00* (2013.01); *A01D 34/66* (2013.01); *A01D 75/00* (2013.01); *A01D 75/002* (2013.01)

(58) Field of Classification Search
CPC .................................................... A01D 75/002
(Continued)

(56) References Cited

U.S. PATENT DOCUMENTS

| 1,421,439 A | 7/1922 | Finckh |
| 2,109,098 A | 2/1938 | Baxter |

(Continued)

FOREIGN PATENT DOCUMENTS

| DE | 4309498 A1 | 9/1994 |
| DE | 20113820 | 12/2001 |

(Continued)

OTHER PUBLICATIONS

U.S. Appl. No. 15/099,827, entitled "Pull-Type Disk Mowing Machine Transport System," MacDon Industries Ltd. & Maschinenfabrik Bernard Krone GmbH Applicants, 45 pp.

(Continued)

*Primary Examiner* — Thomas B Will
*Assistant Examiner* — Mai Nguyen
(74) *Attorney, Agent, or Firm* — Peter K. Zacharias; Patrick M. Sheldrake

(57) ABSTRACT

A wheel-supported frame for an agricultural mower having a tongue, a pivotally connected frame having a pair of main wheel, and a pair of a retractable transport wheels connected to the frame. A mechanism is provided for each transport wheel to deploy the transport wheels and support the mower, the transport wheels being oriented for travel 90 degrees to the direction of travel of the main wheels. The pivoting tongue connection with the main frame provides for at least a 90 degree rotation of the frame relative to the tongue between operating and transport positions so that the mower may be pulled for transport with the mower moving in the direction of its normal lateral width. The transport wheel mechanisms also position the transport wheels where they will not interfere with mower operation, especially pivoting of the tongue.

16 Claims, 6 Drawing Sheets

(51) Int. Cl.
  *A01D 75/00* (2006.01)
  *A01D 34/66* (2006.01)
(58) Field of Classification Search
  USPC .............................. 56/228, 15.1, 15.2, 15.5
  See application file for complete search history.

(56) References Cited

U.S. PATENT DOCUMENTS

| | | | |
|---|---|---|---|
| 2,286,305 A | 6/1942 | Priestley | |
| 2,540,228 A | 2/1951 | Adkisson | |
| 2,833,105 A | 5/1958 | Naery | |
| 2,911,780 A | 11/1959 | Brady | |
| 2,938,588 A | 5/1960 | Stein | |
| 3,241,300 A | 3/1966 | Fell et al. | |
| 3,245,695 A | 4/1966 | Bernard | |
| 3,288,480 A | 11/1966 | Calkins et al. | |
| 3,408,956 A | 11/1968 | Rebenok et al. | |
| 3,515,408 A | 6/1970 | Cagle | |
| 3,523,410 A | 8/1970 | Taylor et al. | |
| 3,577,713 A | 5/1971 | McCarty et al. | |
| 3,590,928 A | 7/1971 | Mirus | |
| 3,648,780 A | 3/1972 | Fueslein et al. | |
| 3,683,602 A | 8/1972 | Scarnato et al. | |
| 3,721,073 A | 3/1973 | Scarnato et al. | |
| 3,786,764 A | 1/1974 | Beers, Jr. et al. | |
| 3,814,191 A | 6/1974 | Tilbury | |
| 3,841,070 A | 10/1974 | Scarnato et al. | |
| 3,881,301 A | 5/1975 | Sawyer et al. | |
| 3,897,832 A | 8/1975 | Leedahl et al. | |
| 3,911,649 A | 10/1975 | Scarnato et al. | |
| 3,919,831 A | 11/1975 | Halls et al. | |
| 3,955,627 A | 5/1976 | Brown | |
| 4,026,365 A | 5/1977 | Andersson et al. | |
| 4,043,403 A | 8/1977 | Anderson et al. | |
| 4,099,364 A | 7/1978 | Kanengieter et al. | |
| 4,106,788 A | 8/1978 | Bohnert | |
| 4,106,813 A | 8/1978 | Goodbary | |
| 4,119,329 A | 10/1978 | Smith | |
| 4,162,085 A | 7/1979 | Miranowski | |
| 4,180,135 A | 12/1979 | Birkenbach et al. | |
| 4,222,334 A | 9/1980 | Peterson | |
| 4,283,071 A | 8/1981 | Pedersen | |
| 4,316,511 A | 2/1982 | Andersen | |
| 4,361,341 A | 11/1982 | Gustafson | |
| 4,418,516 A | 12/1983 | Donovan et al. | |
| 4,418,517 A | 12/1983 | Ehrhart et al. | |
| 4,418,518 A | 12/1983 | Koch et al. | |
| 4,435,948 A | 3/1984 | Jennings | |
| 4,442,662 A | 4/1984 | Jennings | |
| 4,455,034 A | 6/1984 | de Graff et al. | |
| 4,460,193 A | 7/1984 | Dietz et al. | |
| 4,506,904 A | 3/1985 | Kinzenbaw | |
| 4,512,416 A | 4/1985 | Smith | |
| 4,526,235 A | 7/1985 | Kinzenbaw | |
| 4,534,416 A | 8/1985 | Johnson | |
| 4,552,375 A | 11/1985 | Kinzenbaw | |
| 4,558,560 A | 12/1985 | Koch | |
| 4,573,309 A | 3/1986 | Patterson | |
| 4,607,996 A | 8/1986 | Koch | |
| 4,660,654 A | 4/1987 | Wiebe et al. | |
| 4,662,646 A | 5/1987 | Schlapman et al. | |
| 4,682,462 A | 7/1987 | Johnson, Sr. | |
| 4,765,639 A | 8/1988 | Murray | |
| 4,831,814 A | 5/1989 | Frisk et al. | |
| 4,867,245 A | 9/1989 | Stevens | |
| 4,871,028 A * | 10/1989 | Murray | 172/248 |
| 4,905,466 A | 3/1990 | Heppner | |
| 4,934,131 A | 6/1990 | Frisk et al. | |
| 4,986,064 A | 1/1991 | Ermacora | |
| 4,991,383 A | 2/1991 | Ermarcora | |
| 5,000,268 A | 3/1991 | Zimmerman | |
| 5,024,279 A | 6/1991 | Warner et al. | |
| 5,025,616 A | 6/1991 | Moss | |
| 5,113,956 A | 5/1992 | Friesen et al. | |
| 5,136,828 A * | 8/1992 | Ermacora | 56/10.2 R |
| 5,199,250 A | 4/1993 | Ermacora et al. | |
| 5,243,810 A | 9/1993 | Fox et al. | |
| 5,274,990 A | 1/1994 | Aron et al. | |
| 5,429,195 A * | 7/1995 | Turnis | 172/311 |
| 5,566,536 A | 10/1996 | Krafka et al. | |
| 5,642,607 A | 7/1997 | Stephenson et al. | |
| 5,778,647 A | 7/1998 | McLean et al. | |
| 5,839,516 A | 11/1998 | Arnold et al. | |
| 5,901,533 A | 5/1999 | Ermacora et al. | |
| 5,930,988 A | 8/1999 | Hanson | |
| 5,943,848 A | 8/1999 | Rice et al. | |
| 6,152,240 A | 11/2000 | Nonhoff et al. | |
| 6,189,306 B1 | 2/2001 | Walch | |
| 6,209,297 B1 | 4/2001 | Yeomans et al. | |
| 6,213,219 B1 | 4/2001 | Mosdal et al. | |
| 6,238,170 B1 | 5/2001 | Pingry et al. | |
| 6,260,629 B1 * | 7/2001 | Toth | 172/282 |
| 6,273,449 B1 | 8/2001 | Harkcom et al. | |
| 6,321,852 B1 | 11/2001 | Pratt | |
| 6,336,313 B1 | 1/2002 | Bonnewitz | |
| 6,360,516 B1 | 3/2002 | Harkcom et al. | |
| 6,408,950 B1 | 6/2002 | Shoup | |
| 6,421,994 B1 | 7/2002 | Boucher et al. | |
| 6,485,246 B1 | 11/2002 | Harkcom et al. | |
| 6,546,708 B2 | 4/2003 | Faivre | |
| 6,606,956 B1 | 8/2003 | Paluch | |
| 6,702,035 B1 | 3/2004 | Friesen | |
| 6,739,612 B2 | 5/2004 | Colistro | |
| 6,854,251 B2 | 2/2005 | Snider | |
| 6,907,719 B2 | 6/2005 | Ligouy | |
| 7,047,714 B1 | 5/2006 | Stephenson et al. | |
| 7,100,350 B2 | 9/2006 | Breneur | |
| 7,197,865 B1 | 4/2007 | Enns et al. | |
| 7,347,277 B2 | 3/2008 | Enns et al. | |
| 7,552,579 B2 | 6/2009 | Tippery et al. | |
| 7,712,544 B1 | 5/2010 | Misenhelder et al. | |
| 7,849,933 B2 | 12/2010 | Marggi | |
| 7,926,249 B1 | 4/2011 | Cook | |
| 8,112,977 B2 * | 2/2012 | Priepke | 56/228 |
| 8,141,652 B2 | 3/2012 | Poole et al. | |
| 8,209,946 B2 * | 7/2012 | Neudorf et al. | 56/15.2 |
| 8,292,328 B2 | 10/2012 | Honas et al. | |
| 8,464,508 B2 | 6/2013 | Matousek et al. | |
| 9,179,591 B2 | 11/2015 | Barnett et al. | |
| 9,179,592 B2 | 11/2015 | Snider et al. | |
| 9,185,837 B2 | 11/2015 | Barnett et al. | |
| 9,185,838 B2 | 11/2015 | Chan et al. | |
| 9,185,839 B2 | 11/2015 | Kolegaev et al. | |
| 2002/0005629 A1 | 1/2002 | Rosenboom | |
| 2004/0011538 A1 | 1/2004 | Raducha et al. | |
| 2006/0123764 A1 | 6/2006 | McLean et al. | |
| 2011/0197561 A1 | 8/2011 | Priepke | |
| 2011/0272917 A1 | 11/2011 | Hilsabeck et al. | |
| 2013/0284467 A1 | 10/2013 | Snider et al. | |
| 2013/0284468 A1 | 10/2013 | Barnett et al. | |
| 2013/0284469 A1 | 10/2013 | Barnett et al. | |
| 2014/0053522 A1 | 2/2014 | Kolegaev et al. | |
| 2014/0083071 A1 | 3/2014 | Fay, II | |
| 2014/0096498 A1 | 4/2014 | Estock et al. | |
| 2014/0196429 A1 | 7/2014 | Gantzer | |
| 2015/0282426 A1 | 10/2015 | Gantzer et al. | |
| 2016/0007534 A1 | 1/2016 | Fay, II | |

FOREIGN PATENT DOCUMENTS

| | | |
|---|---|---|
| EP | 350513 | 1/1990 |
| EP | 764396 | 3/1997 |
| EP | 628237 B1 | 8/1997 |
| EP | 818134 | 1/1998 |
| EP | 823985 | 2/1998 |
| FR | 2332690 | 6/1977 |
| FR | 2712137 | 5/1995 |
| FR | 2752356 | 2/1998 |
| GB | 2194872 A | 3/1988 |
| GB | 2232055 | 12/1990 |

(56) References Cited

FOREIGN PATENT DOCUMENTS

| | | |
|---|---|---|
| GB | 2490342 | 10/2012 |
| GB | 2504093 | 1/2014 |
| WO | WO2013135676 | 9/2013 |

OTHER PUBLICATIONS

U.S. Appl. No. 15/099,827, entitled "Pull-Type Disk Mowing Machine Transport System," MacDon Industries Ltd. & Maschinenfabrik Bernard Krone GmbH Applicants, 16 pp.

* cited by examiner

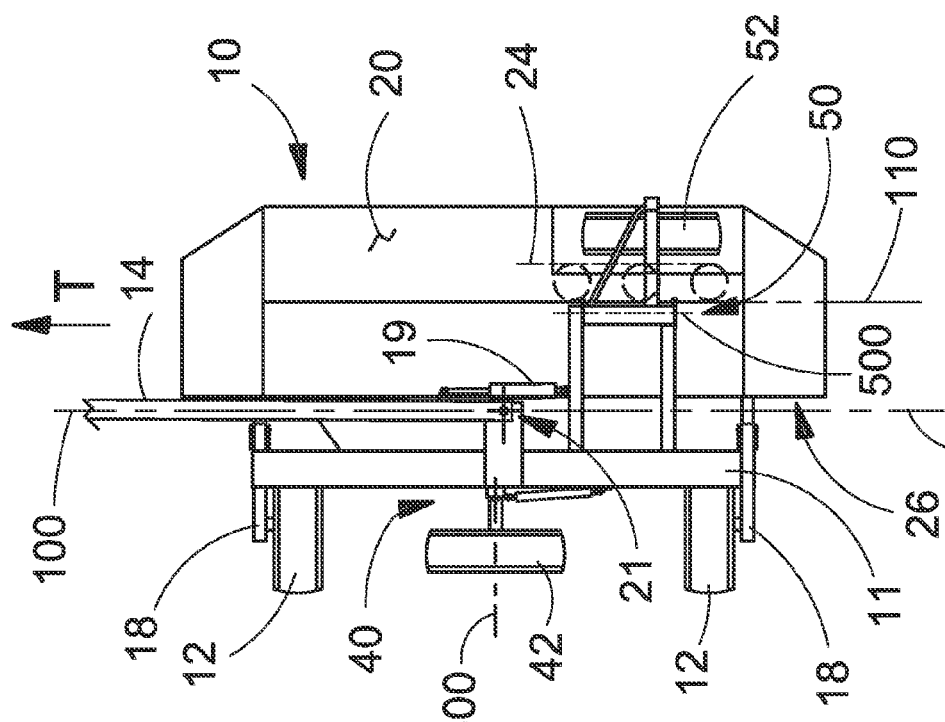
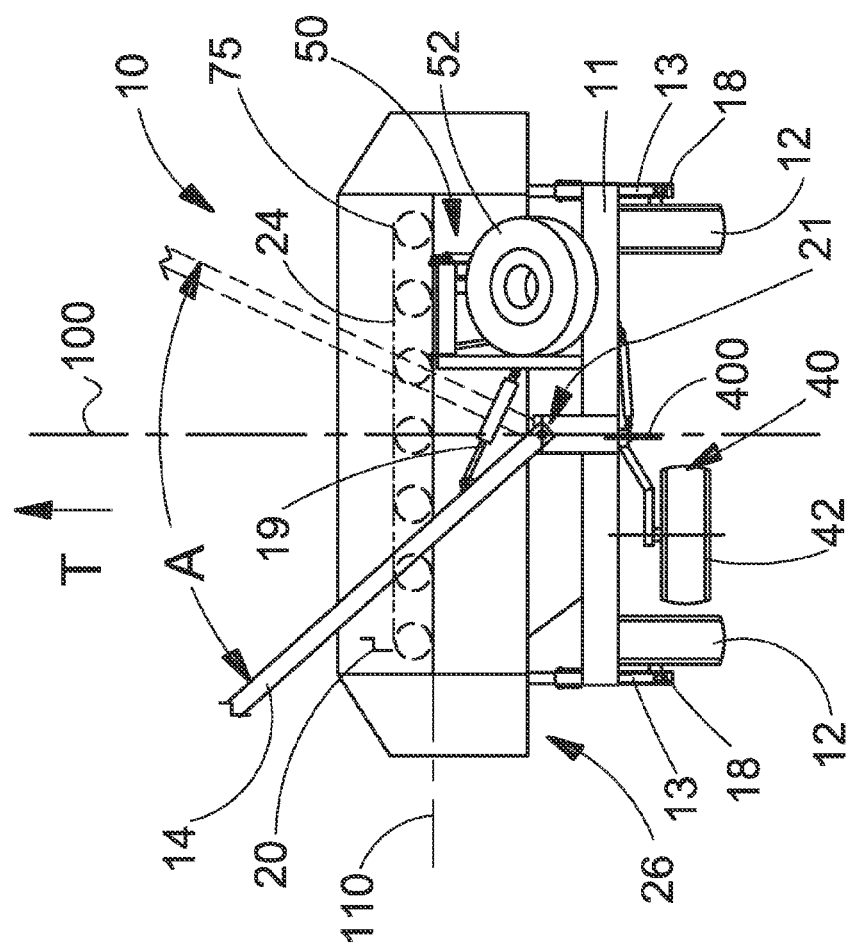

INTEGRAL LATERAL TRANSPORT OF A MOWER

CROSS REFERENCE TO RELATED APPLICATIONS

This application is related to U.S. patent application entitled "Right Side (Front) Lateral Transport Wheel Linkage", Serial No. "xx/xxx,xxx", filed on MM/DD/YYY; and U.S. Patent Application entitled "Hitch Swing Cylinder Mounting Point Repositioning Mechanism", Serial No. "xx/xxx,xxx", filed on MM/DD/YYY. The above applications are herein incorporated by reference.

BACKGROUND OF THE INVENTION

The present invention relates generally to agricultural harvesting machines, and more particularly relates to a mechanism for repositioning the machine as it is trailed behind a prime mover to enable the machine to be transported in less than its normal operating width.

Agricultural mowers are well known and include self-propelled and pull-behind types. One common problem with pull-behind mowers involves transporting the machines between fields as the width of the machine may be 15 feet or more. Machine movement may be necessary over farm lanes, through gates or even some highways where the machine width will not allow passage in the operating orientation. One solution is to reconfigure the mower for transport by re-orienting the mower 90 degrees from its normal operational orientation and towing the mower along its operational lateral axis. This approach generally involves the addition of mechanisms to reorient the wheel axles of the wheels that support the unit in a mowing configuration, hereinafter referred to as "mowing wheels," 90 degrees for lateral transport or add transport wheels that can be deployed for lateral transport. The additional transport wheels and positioning mechanisms are typically complex and often encumber normal operation of the mower.

It would be advantageous to provide an agricultural mower that could be conveniently re-oriented for over-the-road transport towing in the direction of its operational lateral axis. Further advantages would be realized by a lateral transport system that is quickly and easily operated thereby reducing the time necessary to reconfigure the mower between operating and lateral transport configurations. Still further advantages would be realized by a lateral transport system that can be produced with less cost that the separate trailer lateral transport option it replaces.

SUMMARY OF THE INVENTION

Accordingly, Accordingly, the present invention, in any of the embodiments described herein, may provide one or more of the following advantages:

It is an object of the present invention to provide a moveable frame for supporting an agricultural mower in a generally transverse orientation to the direction of travel for mowing operation, and in a generally longitudinal orientation in line with the direction of travel for non-operational transport. A pair of mowing wheels are provided adjacent to a rearward end of the mower frame aligned for travel as the mower and frame are transversely oriented. A pair of transport wheels is also provided, the transport wheels being alignable for travel generally perpendicularly to the operational travel direction, each transport wheel having a moveable support for positioning of the respective transport wheel in a deployed position or a non-deployed position. The transport wheels elevate the frame and lift the mowing wheels above the ground when in the deployed position. Non-deployment of the transport wheels allows the frame to be ground supported by the mowing wheels and positions the transport wheels to minimize interference with mower operation.

A first transport wheel support is disposed along a rearward end of the mower frame when operationally aligned. As the mower frame is rotated from a transverse operational alignment to a longitudinal transport alignment, the first transport wheel support is repositioned to enable lateral support of one side of the mower frame. A second transport wheel support is disposed on the mower frame and is required to move a second transport wheel from a position generally above the mower during mower operation to a deployed position outboard of the operational leading end of the mower and laterally opposed to the first transport wheel when the mower is aligned for transport.

The frame further includes a draft tongue pivotally connected to the frame for movement about an upstanding pivot axis. The draft tongue may be positioned in at least a first position for towing the mower with a prime mover for mowing operation and a second position in which the draft tongue is aligned to pull the mower in a longitudinal transport orientation trailing behind the prime mover. The mower frame may be operationally angled in relation to the draft tongue to allow the mower frame to be trailed along a path offset from the path of the prime mover. The configuration of the first and second transport wheel supports is such that the transport wheel and support positions when the transport wheels are not deployed does not interfere with pivoting movement of the draft tongue.

Another object of the present invention to moveable transport wheels for a mower support frame that are selectively positionable to allow the mower to be pulled in a direction that is rotated approximately 90 degrees from its normal operational orientation and thereby reduce the transport width of the machine. The moveable wheels in conjunction with a pivoting tongue that may be oriented to a position generally in line with the transverse width of the mower enable towing of the mower along its normal lateral axis. Repositioning the draft tongue and transport wheels enables normal mower operation. Mechanism for moving the transport wheels are configured to avoid interference with normal operation of the mower, even on center-pivot mowers in which the draft tongue must pivot during mower operation to allow the mower travel path to be laterally offset to either side of the prime mover path.

Yet another object of the present invention to a moveable frame for supporting an agricultural mower that is selectively positionable in a transverse operational orientation or a lateral transport orientation that is durable in construction, inexpensive of manufacture, carefree of maintenance, easily assembled, and simple and effective to use. The moveable frame relies on well-known methods for repositioning moveable elements on agricultural equipment and enables re-positioning of the mower between transport and operational configurations with minimal machine operator effort.

These and other objects are achieved in accordance with the instant invention as described in detail herein.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a plan view of an agricultural pull-behind harvester incorporating a first embodiment of the lateral transport system of the present invention and is shown in an operating configuration;

FIG. 2 is a plan view of the agricultural harvester shown in FIG. 1, wherein the harvester is shown configured for transport;

DESCRIPTION OF THE PREFERRED EMBODIMENT(S)

Figure 3:
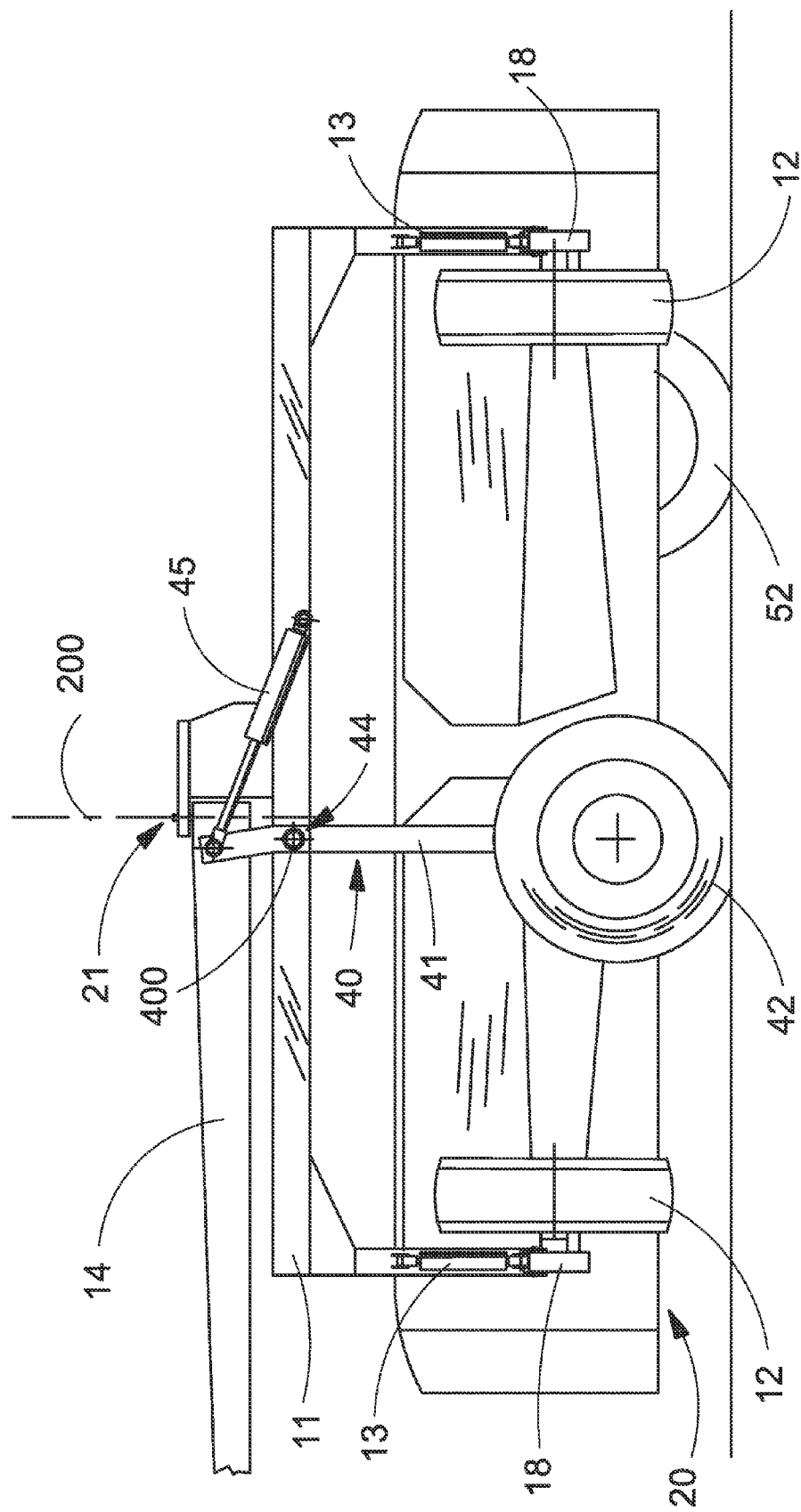
FIG. 3 is a first side elevation view of the agricultural harvester shown configured for lateral transport.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures. Alpha designations following a numeric designator are used to distinguish the two similar parts, typically right side/left side on the generally symmetrical invention; reference to the numeric designator alone indicates the either part.

Referring now to the drawings and particularly to FIG. 1, an agricultural implement 10 incorporating the principles of the instant invention can best be seen. Implement 10 as presented herein is what is generally known as a pull-behind center-pivot mower and is provided with a generally conventional movable frame 11 mobilely supported for operation over the ground by a pair of transversely spaced-apart trailing main wheels 12 and a draft tongue 14 configured for connection to a tractor for forward movement (direction "T") along a travel axis 100. A mower 20 is operably connected to and supported by the frame 11. Trailing main wheels 12 are preferably connected to the frame 11 by including a pair of movable trailing arms 18 whose position is managed by wheel actuators 13 to raise and lower the main wheels relative to the frame 11 thereby enabling the vertical position relative to the ground of frame 11 to be adjusted. The wheel 12 adjustment capability allows the operating height of the mower 20 above the ground to be readily adjusted. Implement 10 is shown in an operating configuration in FIG. 1 with the mower 20 generally transversely aligned to the direction of travel along transverse axis 110.

As is common in many pull-behind mowers, the draft tongue 14 is pivotally connected to the implement frame 11 at pivot connection 21, the pivotal movement thereof rotating the frame 11 and the connected mower 20 about an upstanding implement pivot axis 200. This pivotal movement between the frame 11 and tongue 14 normally enables the mower 20 and travel axis 100 to be laterally offset from the tractor during operation to avoid driving the tractor through standing crop material. Pivotal movement between the frame 11 and the tongue 14 about the implement pivot axis 200 is typically accomplished by a pivot actuator 19 interconnecting the tongue 14 and the frame 11, movement of which is selectively controlled by the tractor operator using the tractor hydraulic control system. Through manipulation of the implement pivot actuator 19, typically a hydraulic cylinder, the mower 20 can be angled relative to the draft tongue 14 to operative position outboard to the right or left of the tractor so that the implement 10 can be operated without the tractor running over the standing crop. A typical range of pivoting is shown as arc "A" in FIG. 1 and is commonly angled up to 45 degrees in either direction from the operation travel axis 100 as shown in FIG. 1. In the present invention, the pivot actuator 19 is modified to increase the pivoting range of the draft tongue 14.

Referring now to FIG. 2 in conjunction with FIG. 1, the implement 10 is shown configured for lateral transport of the mower 20 wherein the transverse axis 110 of the mower is aligned in parallel with the direction of travel (axis 100). A pair of moveable transport wheel supports 40, 50 each having a respective transport wheel 42, 52, allows the implement to be in a lateral transport configuration. The transport wheel supports 40, 50, are shown in a non-deployed position in FIG. 1 and in a deployed position in FIG. 2. Additionally, the draft tongue 14 is pivoted beyond the normal operational range (as shown in FIG. 1) to a transport position aligned generally perpendicularly to the operational travel direction (FIG. 1) bringing the transverse axis 110 generally parallel to the transport travel axis 100 to allow the implement to be transported in a lateral configuration, shown in FIG. 2.

Pivoting of the frame 11 and draft tongue 14 enables the frame 11 to be positioned in at least an operating position in which the transverse axis 110 is oriented transversely to the travel axis 100, and a transport position in which the transverse axis is oriented generally parallel to the travel axis 100. The operating position is shown in FIG. 1 and may include draft tongue angled orientations within the range "A" as illustrated. The transport position is shown in FIG. 2. As described herein, the travel axis 100 is laterally positioned so that it intersects the upstanding pivot axis 200, regardless of the position of the main frame.

Figure 4:
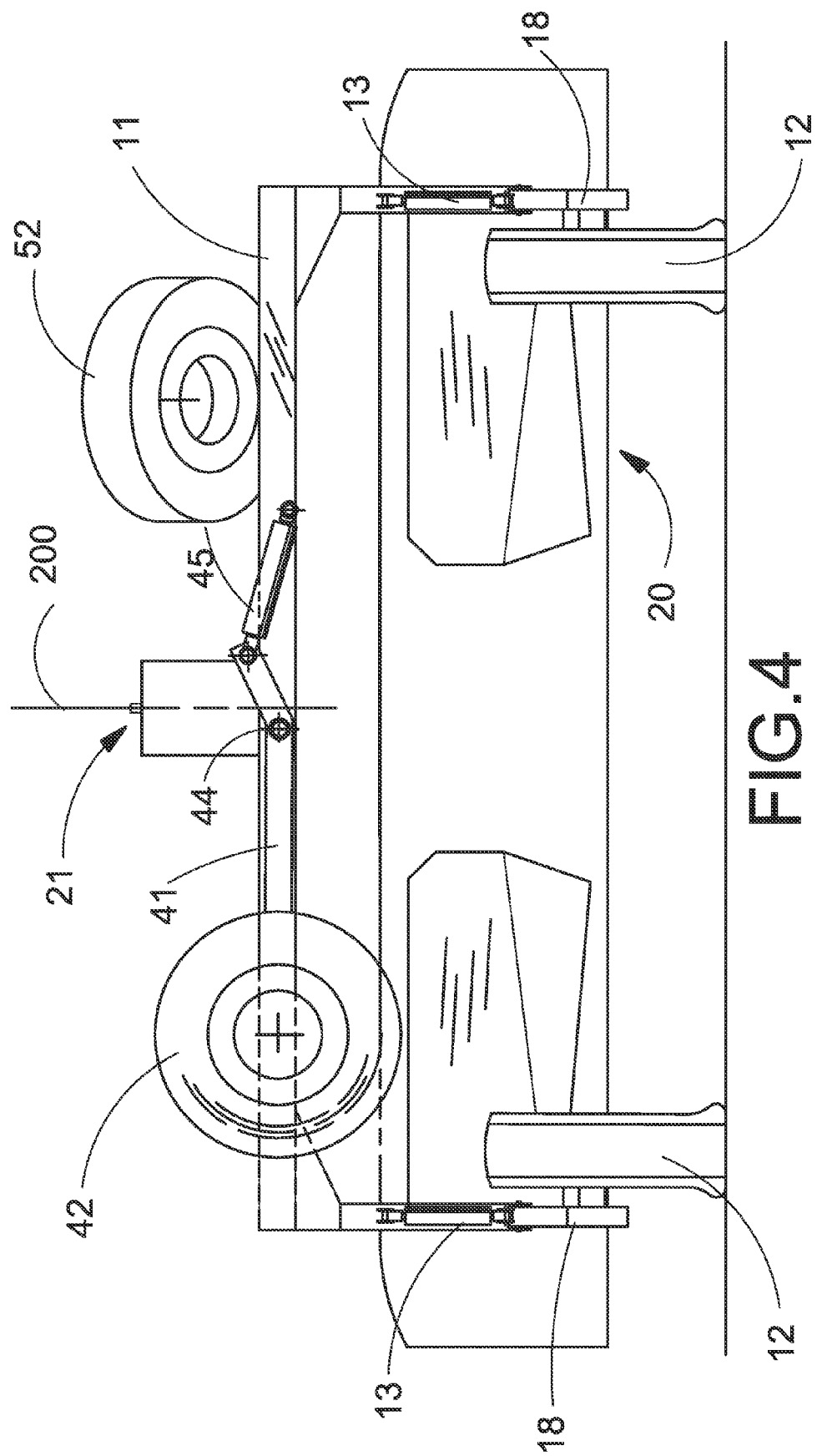
FIG. 4 is a rear elevation view of the agricultural harvester shown configured for operation and the transport wheels in a non-deployed position.
Figure 5:
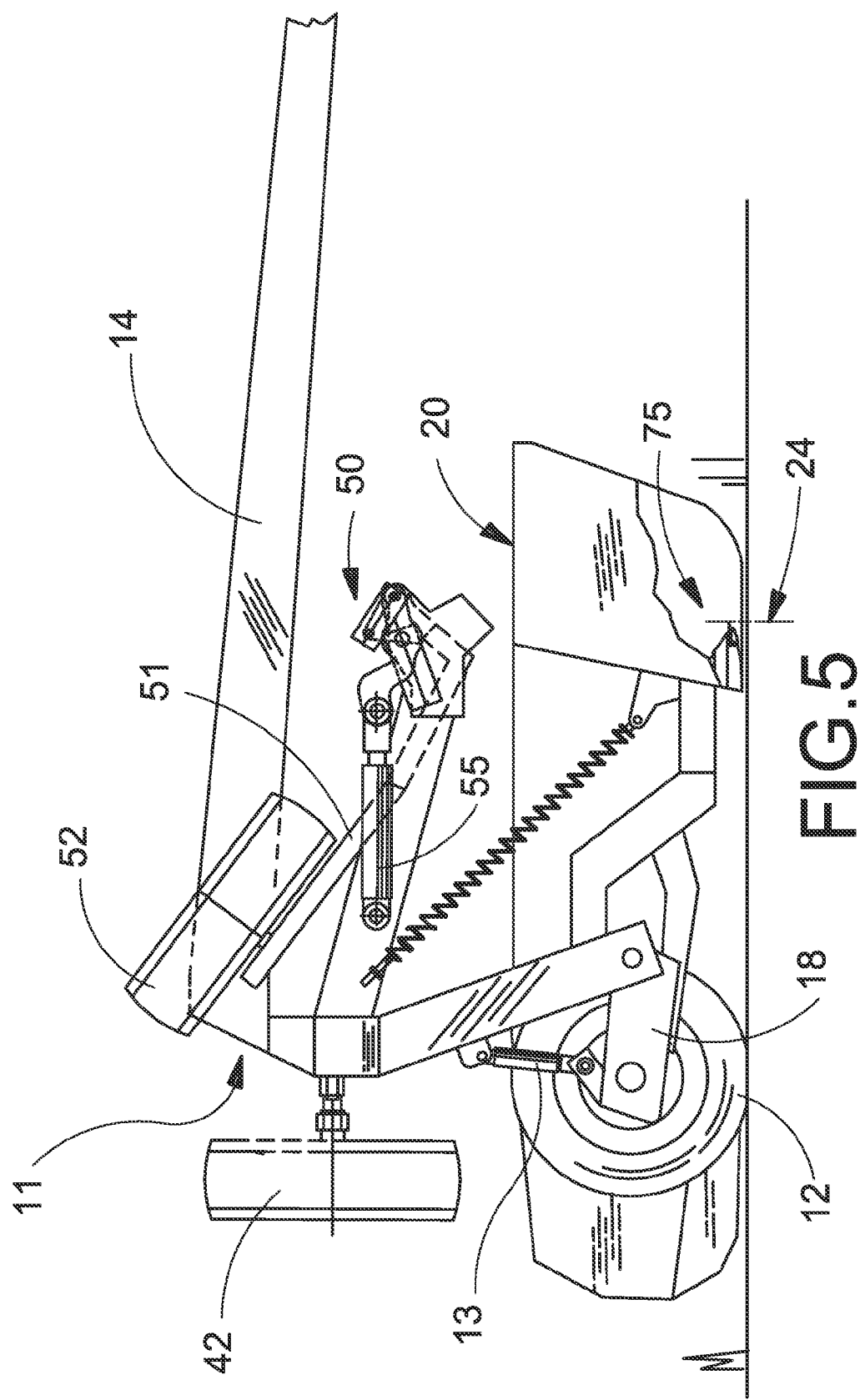
FIG. 5 is a second side elevation view of the agricultural harvester shown configured for operation and the transport wheels in a non-deployed position.

Referring next to FIGS. 3 through 5, a first transport wheel support 40 is shown comprising a first support arm 41 pivotally connected at first pivot 44 to the frame 11 for movement about a first pivot axis 400 that is arranged generally perpendicularly to the transverse axis 110. A first actuator 45 is connected to the first support arm 41 to move the arm between a deployed position for transport (shown in FIG. 3) and a non-deployed position for mowing operations (shown in FIGS. 4 and 5). The configuration of the first wheel support 40 is such that the first transport wheel 42 is moved downwardly in relation to the frame 11 as the wheel support is deployed, eventually elevating the frame 11 upon reaching the deployed position (FIG. 3) so that the frame is partially supported by the first transport wheel 42 and the mowing wheels 12 are elevated above the ground. As the first transport wheel support is moved toward the non-deployed position (shown in FIGS. 4 and 5), the wheel 42 is moved upwardly, generally adjacent to the rearward end 26 of the mower 20 and frame 11 to place the wheel 42 in a position where it will not interfere with normal operation of the mower 20. The non-deployed position elevates the wheel 42 generally above the discharge of the mower so the wheel 42 and related wheel support 40 are not impinged upon by the crop being discharged from the mower. The first support arm pivots approximately 90 degrees (meaning about one-quarter of a full circle rotation) when moving between the deployed and non-deployed positions.

Figure 6:
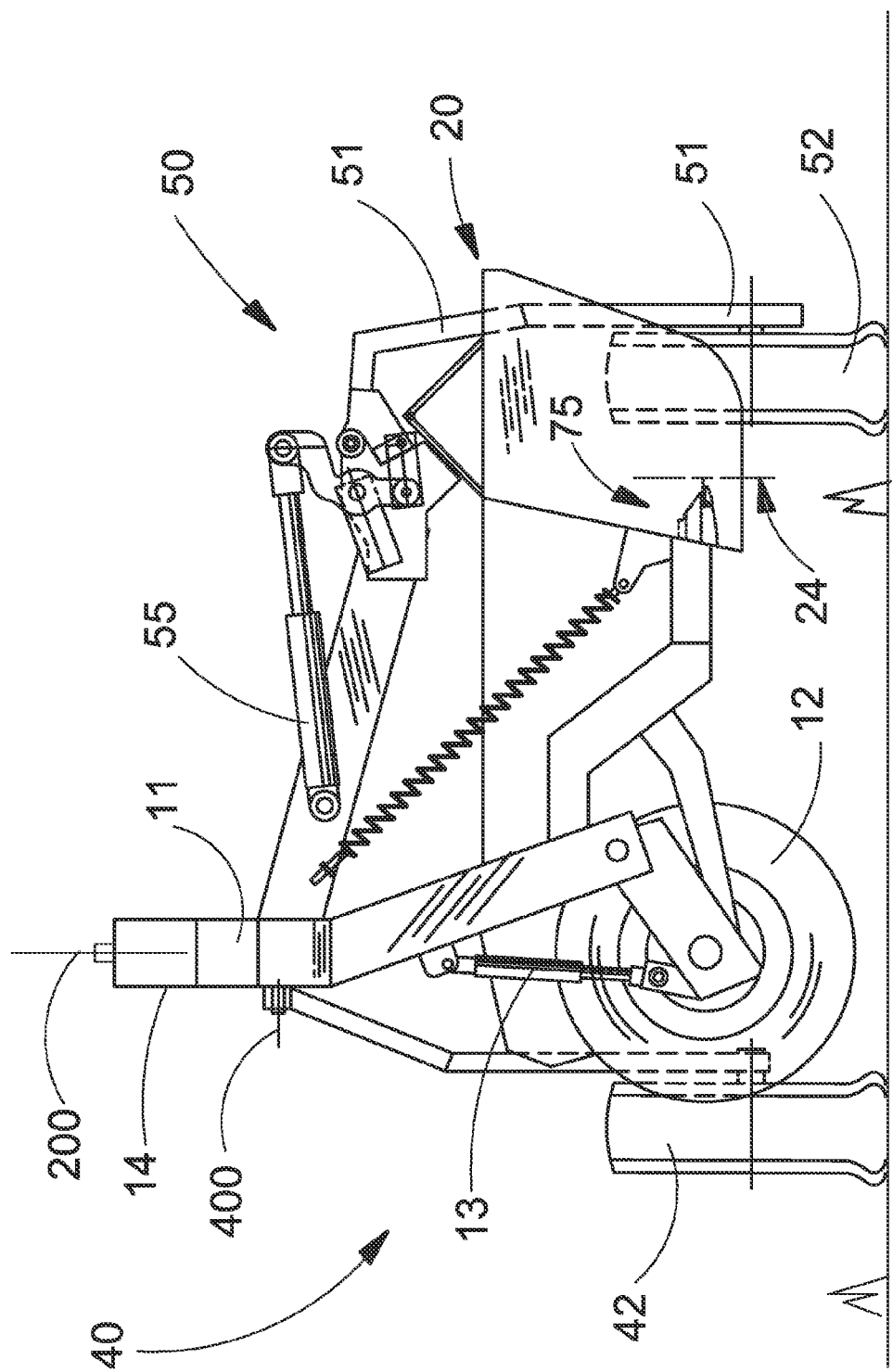
FIG. 6 is a first side elevation view of the agricultural harvester shown configured for lateral transport.
Figure 7:
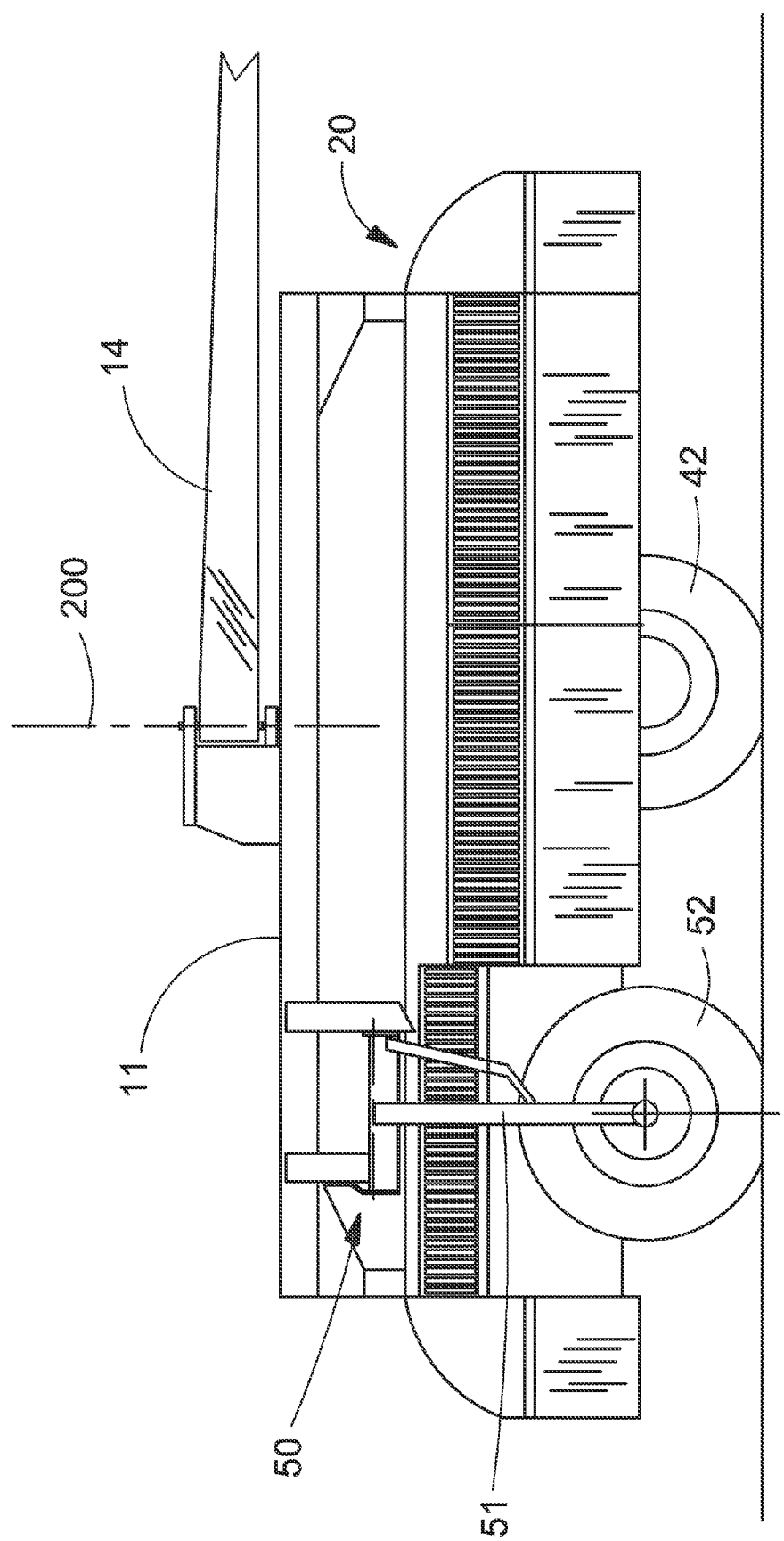
FIG. 7 is a second side elevation view of the agricultural harvester shown configured for lateral transport.

In FIGS. 5 through 7, a second transport wheel support 50 is shown comprising a second support arm 51 moveably connected to the frame 11 for pivoting movement about a second pivot axis 500. The orientation of second pivot axis 500 and the configuration of support arm 51 enable the second transport wheel 52 to be moved between a non-deployed position, generally above the mower 20 and cutterbar 75 as shown in FIG. 5, and a deployed position outwardly adjacent to the operational leading end 24 of the cutterbar 75. Provisions may be provided in the mower shield panels to retract some panels to allow the second transport wheel to be more closely positioned adjacent to the leading edge of the cutterbar 75. Movement of the second support arm 51 is accomplished by a second actuator 55. Similar to the first wheel support arrangement, the configuration of the second wheel support 50 is such that the second transport wheel 52 is moved outwardly and downwardly in relation to the frame 11 as the wheel support is deployed. The frame 11 is elevated once the second transport wheel 52 reaches the deployed position (FIG. 6) so that the frame is now fully supported by the first and second transport wheels 42, 52 and the mowing wheels 12 are elevated above the ground.

Coordination of the deployment of the first and second transport wheels 42, 52 is necessary to provide a smooth transition in the support for the implement. When deploying the transport wheels, second transport wheel support 50 must be deployed first. As the second transport support arm 51 pivots and the wheel 52 initially contacts the ground, the mower frame 11 must be allowed to shift slightly in the direction of normal operation. Mowing wheels 12 allow for such movement. Once the second transport wheel support arm 51 reaches the fully deployed position, the first transport wheel support may then be deployed. Movement of the first transport wheel 42 as the wheel support 41 is rotated toward the deployed position and the wheel 42 initially contacts the ground is in the normal travel direction of the transport wheel 42, thus the wheel itself will rotate as the first wheel support arm 41 moves toward the fully deployed position. Reconfiguring the mower for mowing operations requires a reversed sequence with the first transport wheel support 40 being retracted first followed by retraction of the second transport wheel support 50. Operation of the actuators 19, 45, 55 may be by individual manual control or may be coordinated to allow a machine operator to reconfigure the mower between operating and lateral transport modes with minimal trips from the tractor to the mower. It is preferable to provide at least one interlock to prevent unintentional movement of the mower frame between the two modes.

In order for the non-deployed position of the second transport wheel to avoid interference with operation of the mower, specifically angling of the draft tongue 14, the second transport wheel support 50 is designed with a low profile and to position the transport wheel 52 sufficiently rearwardly to avoid interference with the draft tongue. The rearward positioning also maintains the mower center of gravity sufficiently low when configured for operating to assure avoid lifting an inside mowing wheel 12 during turning maneuvers, especially on sloping terrain. To this end, the support arm 51 pivots approximately 270 degrees (meaning about three-quarters of a full circle rotation) between the non-deployed position and the deployed positions. The transport wheel 52 is moved from a non-deployed position above the mower and sufficiently rearward to avoid interference with the draft tongue 14 to a deployed position where the wheel is moved outboard of the leading end 24 of the cutterbar 75 and sufficiently downward to contact the ground and elevate the frame 11 for transport.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An agricultural pivot-tongue mower having an integral lateral transport apparatus comprising:
   an elongate tongue for connection to a prime mover for movement of the mower in at least a forward direction along a travel axis;
   a ground-supported main frame connected to the tongue at an end distally opposed from the prime mover, the main frame connection being pivotable about an upstanding pivot axis between an operating position and a transport position, the main frame having a generally horizontal first axis intersecting the pivot axis and being generally perpendicular to the travel axis when the main frame is in the operating position and generally parallel to the transport axis when in the transport position;
   a mower supported by the main frame and having a forwardly disposed cutterbar defining a cut line generally parallel to and spaced-apart from the first axis;
   a pair of main wheels supporting the main frame and aligned for movement along the travel axis when the main frame is in the operating position;
   a first transport wheel connected to the main frame and moveable between a retracted position for a mowing operation and a deployed position for a transport operation, the retracted position positioning the first transport wheel rearwardly adjacent to the mower and above the pair of main wheels for the mowing operation so that the first transport wheel is disposed entirely above the pair of main wheels, movement toward the deployed position lowering the first transport wheel with respect to the main frame, the first transport wheel being aligned for movement along the travel axis when the main frame is in the transport position for the transport operation; and
   a second transport wheel connected to the main frame and moveable between retracted and deployed positions, the second transport wheel being positioned generally above the cutterbar and inboard of the cut line when in the retracted position, movement toward the deployed position causing the second transport wheel to extend at least partially below the cutterbar and outboard of the cut line with respect to the main frame.

2. The mower of claim 1, wherein the first transport wheel connection to the main frame is an elongate first transport member pivotally connected to the main frame and connected to the first transport wheel distal from the main frame connection, the first transport member being pivotable about a generally horizontal first transport member axis that is generally perpendicular to the first axis.

3. The mower of claim 2, wherein the first transport member pivots approximately 90 degrees when moving the first transport wheel between the retracted and the deployed positions.

4. The mower of claim 1, wherein the second transport wheel connection to the main frame is an elongate second transport member pivotally connected to the main frame and connected to the second transport wheel distal from the main frame connection, the second transport member being pivotable about a second transport member axis that is generally parallel to the first axis.

5. The mower of claim 4, wherein the second transport member pivots at least 180 degrees when moving the second transport wheel between the retracted and the deployed positions.

6. The mower of claim 4, wherein the second transport member pivots approximately 270 degrees when moving the second transport wheel between the retracted and the deployed positions.

7. The mower of claim 1, further comprising a frame actuator for pivoting the main frame in relation to the draft tongue, a first transport wheel actuator for moving the first transport wheel between the retracted and the deployed positions, and a second transport wheel actuator for moving the first transport wheel between the retracted and the deployed positions.

8. A lateral transport mechanism for an agricultural pivot tongue mower comprising:
an elongate tongue for operably pulling the mower along a travel axis;
a movable frame pivotally coupled to said tongue and movable between an operating position and a transport position, the moveable frame defining a first axis, the first axis being oriented generally transverse to the travel axis when the main frame is in the operating position, the first axis being oriented generally parallel to the travel axis when the main frame is in the transport position;
a mower operably supported by the main frame, the mower having a leading edge aligned generally parallel to and spaced apart from the first axis;
a first transport wheel connected to the main frame and moveable along the first axis between retracted and deployed positions, the retracted position positioning the first transport wheel rearwardly adjacent to the main frame and elevated above the ground, movement toward the deployed position lowering the first transport wheel with respect to the main frame, the first transport wheel being aligned for movement along the travel axis when the main frame is in the transport position; and
a second transport wheel connected to the main frame and moveable between retracted and deployed positions, the second transport wheel being positioned generally above the mower and inboard of the leading edge when in the retracted position, movement toward the deployed position causing the second transport wheel to extend at least partially below the mower and outboard of the leading edge with respect to the first axis.

9. The mechanism of claim 8, wherein the first and second transport wheels are aligned for movement along the travel axis when the main frame is in the transport position and the first and second transport wheels are in the deployed positions.

10. The mower of claim 9, further comprising a frame actuator for pivoting the main frame in relation to the draft tongue, a first transport wheel actuator for moving the first transport wheel between the retracted and the deployed positions, and a second transport wheel actuator for moving the first transport wheel between the retracted and the deployed positions.

11. The mechanism of claim 10, wherein the first transport wheel further comprises an elongate first transport member pivotally connected to the main frame and interconnecting the main frame and the first transport wheel, the first transport member main frame connection being pivotable about a generally horizontal first transport member axis that is generally perpendicular to the first axis.

12. The mechanism of claim 11, wherein the first transport member pivots approximately one-quarter of a full turn when moving the first transport wheel between the retracted and the deployed positions.

13. The mechanism of claim 10, wherein the second transport wheel further comprises an elongate second transport member pivotally connecting the second transport wheel to the main frame, the second transport member being pivotable about a second transport member axis that is generally parallel to the first axis.

14. The mechanism of claim 13, wherein the second transport member pivots at least one half of a full turn when moving the second transport wheel between the retracted and the deployed positions.

15. The mechanism of claim 14, wherein the second transport member pivots approximately three-quarters of a full turn when moving the second transport wheel between the retracted and the deployed positions.

16. An agricultural pivot-tongue mower having an integral lateral transport apparatus comprising:
an elongate tongue for connection to a prime mover for movement of the mower in at least a forward direction along a travel axis;
a ground-supported main frame connected to the tongue at an end distally opposed from the prime mover, the main frame connection being pivotable about an upstanding pivot axis between an operating position and a transport position, the main frame having a generally horizontal first axis intersecting the pivot axis and being generally perpendicular to the travel axis when the main frame is in the operating position and generally parallel to the transport axis when in the transport position;
a mower supported by the main frame and having a forwardly disposed cutterbar defining a cut line generally parallel to and spaced-apart from the first axis;
a pair of main wheels supporting the main frame and aligned for movement along the travel axis when the main frame is in the operating position;
a first transport wheel connected to the main frame and moveable along the generally horizontal first axis between retracted and deployed positions, the retracted position positioning the first transport wheel rearwardly adjacent to the mower and aligned for movement along an axis transverse to the travel axis, movement toward the deployed position lowering the first transport wheel with respect to the main frame, the first transport wheel being aligned for movement along the travel axis when the main frame is in the transport position; and a second transport wheel connected to the main frame and moveable between retracted and deployed positions, the second transport wheel being positioned generally above the cutterbar and inboard of the cut line when in the retracted position, movement toward the deployed position causing the second transport wheel to extend at least partially below the cutterbar and outboard of the cut line with respect to the main frame.

\* \* \* \* \*